(12) United States Patent
Knauft et al.

(10) Patent No.: US 10,168,942 B2
(45) Date of Patent: Jan. 1, 2019

(54) AUTOMATICALLY REMOVING DEPENDENCY ON SLOW DISKS IN A DISTRIBUTED STORAGE SYSTEM

(71) Applicant: VMware, Inc., Palo Alto, CA (US)

(72) Inventors: Eric Knauft, San Francisco, CA (US); Edward Joseph Goggin, Concord, MA (US); Ruocheng Li, Milpitas, CA (US); Radhika Vullikanti, Foster City, CA (US); Gopala Suryanarayana, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 15/255,063

(22) Filed: Sep. 1, 2016

(65) Prior Publication Data

US 2018/0060193 A1    Mar. 1, 2018

(51) Int. Cl.
*G06F 3/06* (2006.01)
*G06F 11/00* (2006.01)

(52) U.S. Cl.
CPC .......... *G06F 3/0647* (2013.01); *G06F 11/008* (2013.01)

(58) Field of Classification Search
CPC .... G06F 3/0619; G06F 3/0647; G06F 11/008; G06F 11/1076
See application file for complete search history.

(56) References Cited

U.S. PATENT DOCUMENTS

| | | | | |
|---|---|---|---|---|
| 8,850,288 B1* | 9/2014 | Lazier | ................ | G06F 11/1048 714/763 |
| 8,887,006 B2* | 11/2014 | Xia | ........ | G06F 11/004 370/242 |
| 9,645,903 B2* | 5/2017 | Vahidsafa | ........... | G06F 11/2094 |
| 2015/0074367 A1* | 3/2015 | Cher | ..................... | G06F 11/008 711/165 |
| 2015/0234719 A1* | 8/2015 | Coronado | ............. | G06F 11/203 714/6.3 |
| 2016/0350391 A1* | 12/2016 | Vijayan | ............. | G06F 17/30575 |

* cited by examiner

*Primary Examiner* — Joseph R Kudirka
(74) *Attorney, Agent, or Firm* — Fish & Richardson P.C.

(57) ABSTRACT

Exemplary methods, apparatuses, and systems determine that a disk drive in a distributed storage system is failing. In response to determining that the disk drive is failing, it is determined if an object has object components stored on the failing disk drive. Object components are flagged based on whether the object components will become inaccessible in the event the disk drive fails or is unmounted. Object components that are flagged with an evacuate flag are migrated from the failing disk drive to one or more other disk drives in the distributed storage system to prevent objects from becoming inaccessible.

20 Claims, 5 Drawing Sheets

AUTOMATICALLY REMOVING DEPENDENCY ON SLOW DISKS IN A DISTRIBUTED STORAGE SYSTEM

FIELD OF THE INVENTION

The various embodiments described in this document relate to the management of storage object components stored on disk drives in a distributed storage system.

BACKGROUND OF THE INVENTION

In a distributed storage system, a given storage object is composed of components on multiple disk drives. If one of the disk drives becomes slow, it may be an indication that the disk drive will fail. The slow disk drive itself may cause problems for accessing the storage objects that have components on the slow disk drive, effectively locking up the entire object. This can create data loss issues with information stored on the failing disk drives.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a method of managing storage objects and object components stored on a plurality of disk drives in a distributed storage system. In particular, embodiments are directed to determining that a disk drive in a distributed storage system has been designated as failing. In response to determining that the disk drive has been designated as failing, an object coordinator determines if there are object components of an object on the failing disk drive that will result in the object being inaccessible in the event the disk drive fails or is unmounted. In response to determining that the object will no longer be accessible upon loss of the failing disk drive, the object coordinator marks the object component with an "evacuate" flag to indicate that the object component should be evacuated or migrated to another disk drive in the distributed storage system. An evacuating agent migrates the object component, and other object components marked with the "evacuate" flag from the failing disk drive to one or more other disk drives in the distributed storage system. Marking object components with the "evacuate" flag ensures that object components that must be migrated from the failing disk drive to maintain an objects accessibility are migrated to another disk drive in the distributed storage system to prevent the loss of data. Object components for objects that will not become inaccessible in the event the disk drive fails or is unmounted are marked with an "absent" flag and may be given a lower migration priority or not migrated, by the evacuating agent. In some embodiments, where the "absent" object component is not migrated by the evacuating agent, the redundancy of the object is reduced.

This document further describes embodiments that include monitoring a plurality of disk drives in the distributed storage system and determining a performance metric for each disk drive in the plurality of disk drives. The performance metric for a disk drive is compared to a target range or threshold for the performance metric and, when the performance metric is outside the target range, the disk drive is designated as a failing disk drive.

Figure 1:
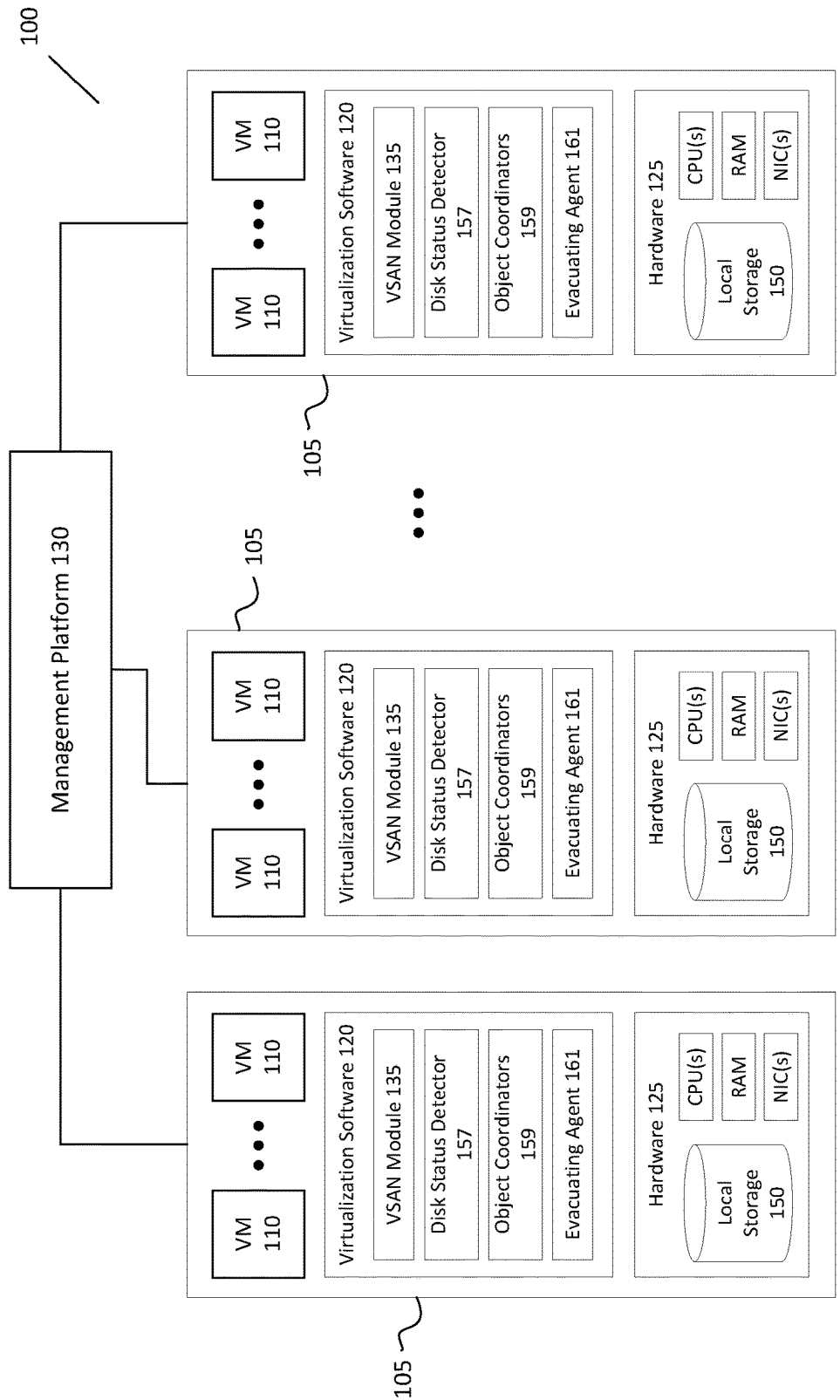
FIG. 1 illustrates, in block diagram form, an exemplary virtual data center environment including one or more networked processing devices configured to detect failing disk drives and evacuate storage object components.

FIG. 1 illustrates, in block diagram form, exemplary computing environment 100, including one or more networked processing devices 105 configured to detect failing disk drives and evacuate storage object components. Processing devices 105 may also be referred to within this document as nodes, computers, and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized computer, networking, storage, or security service (e.g., a firewall, webserver, database server, etc.). In one embodiment, computing environment 100 provides segregated server-based computing environments for multiple datacenter tenants. A datacenter tenant refers to a group of users that share common access with specific privileges. For example, the group of users may have common access to stored data objects, applications, etc. that users of another tenant may not access.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105, via a wired or wireless network, with one another.

Virtualization software layer 120 runs on hardware 125 of host server or node (e.g., a physical computer) 105. Virtualization software layer 120 manages VMs 110 and physical resources, such as hardware 125. Additionally, virtualization software layer 120 maintains virtual-to-physical hardware mappings. For example, virtualization software layer 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105.

Management platform 130 is associated with nodes 105. Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130.

Local storage 150 housed in or otherwise directly attached to the nodes 105 may include combinations of solid-state drives (SSDs) and/or magnetic or spinning disks (MDs). As used in this document, the term "housed" or "housed in" may be used to encompass both housed in or otherwise directly attached storage. In certain embodiments, SSDs serve as a read cache and/or write buffer in front of magnetic disks to increase I/O performance.

Each node 105 includes storage management or VSAN module 135 to automate storage management workflows and provide access to objects. Each VSAN module 135 (e.g., through an object management layer or submodule) communicates with other VSAN modules 135 of other nodes 105 to create and maintain an in-memory metadata database (e.g., maintained separately but in synchronized fashion in the memory of each node 105) that contains metadata describing the locations, configurations, policies, and relationships among the various objects stored in an object store. This in-memory metadata database is utilized by a VSAN module 135, for example, when an administrator first creates a virtual disk for a VM 110 as well as when the VM 110 is running and performing I/O operations (e.g., read or write) on the virtual disk. VSAN module 135 traverses a hierarchy of objects using the metadata in the in-memory database in order to properly route an I/O operation request to the node (or nodes) 105 that houses (house) the actual physical local storage that backs the portion of the virtual disk that is subject to the I/O operation.

Each node 105 includes disk status detector 157, object coordinators 159, and evacuating agent 161. Disk status detector 157 monitors the health and functions of a plurality of disk drives in the distributed storage system 100. Disk status detector 157 determines performance metrics for one or more of the plurality of disk drives and compares the measured values for the performance metrics with a pre-established target range or threshold. Based on the result of the comparison, disk status detector 157 determines whether each of the plurality of disk drives is functioning properly or is showing indications of failure. Disk status detector 157 maintains a data structure indicating at least the disk drives in the distributed storage system 100 that are determined to be failing. In some embodiments, the data structure may be represented as a directory, a list, an index, a register, or any other equivalent.

Object coordinators 159 may represent one or a plurality of object coordinators. In embodiments, each object stored in the distributed storage system 100 has an object coordinator 159 that is responsible for managing the object components of the object. As part of managing object components, object coordinator 159 will monitor a directory containing the status of disk drives. In some embodiments, the directory includes the status of all disk drives in distributed storage system 100. In other embodiments, the directory includes identification information for only disk drives that have been designated as failing by the disk status detector 157.

Object coordinator 159 also determines a condition of object components for the corresponding object and determines a flag to mark for each object component stored on a failing disk drive. In some embodiments, object coordinator 159 marks the object component with an "evacuate" flag or an "absent" flag. The "evacuate" flag provides an indication to evacuation agent 161 that the object component should be migrated or evacuated to another disk drive in distributed storage system 100. The "absent" flag provides an indication to the evacuation agent 161 that no action is necessary for the object component. In one embodiment, the "absent" flag also indicates that I/O requests related to the "absent" object component should be directed to another copy of the object component stored on another disk drive that is not failing. This can ensure that if the failing disk drive ultimately fails or is unmounted, I/O requests related to the "absent" object component can proceed uninterrupted, in addition to allowing object component(s) marked with the "evacuate" flag to migrate off the failing disk drive more quickly. In one embodiment, the "absent" flag indicates that the object component is an object component with a lower priority. In such embodiments, the object components are migrated from the failing disk drive, but all of the object components marked with the "evacuate" flag are given priority and evacuated or migrated to another disk drive prior to any of the object components marked with the "absent" flag. Some embodiments wait for a configurable or default threshold period of time to expire (e.g., one hour) prior attempting to migrate components marked with the "absent" flag. In some embodiments, as I/O requests are stopped for the "absent" object component, when the "absent" object component is migrated to another disk drive, object coordinator 159 performs a re-sync of the object component, with an up-to-date copy of the object component, to ensure that the object component is not stale.

In embodiments, when the object component marked with the "evacuate" flag has been migrated to another disk drive, object coordinator 159 may mark the object component to indicate that the object component was successfully evacuated.

In some embodiments, the object coordinator 159 for a particular object is located on a node that also stores one or more object components of the object. In other embodiments, object coordinator 159 for the particular object is located a node separate from a node that is storing one or more object components of the object.

As described above, evacuation agent 161 determines object components stored on a failing disk drive that are marked with the "evacuate" flag. Evacuation agent 161 determines one or more other disk drives to store the evacuated object components. In one embodiment, evacuation agent 161 selects a disk drive that is healthy (e.g., not designated as failing) and not currently storing the evacuated component. The evacuation agent 161 notifies the object coordinator of the new location of evacuated object components in the distributed storage system 100.

Figure 2:
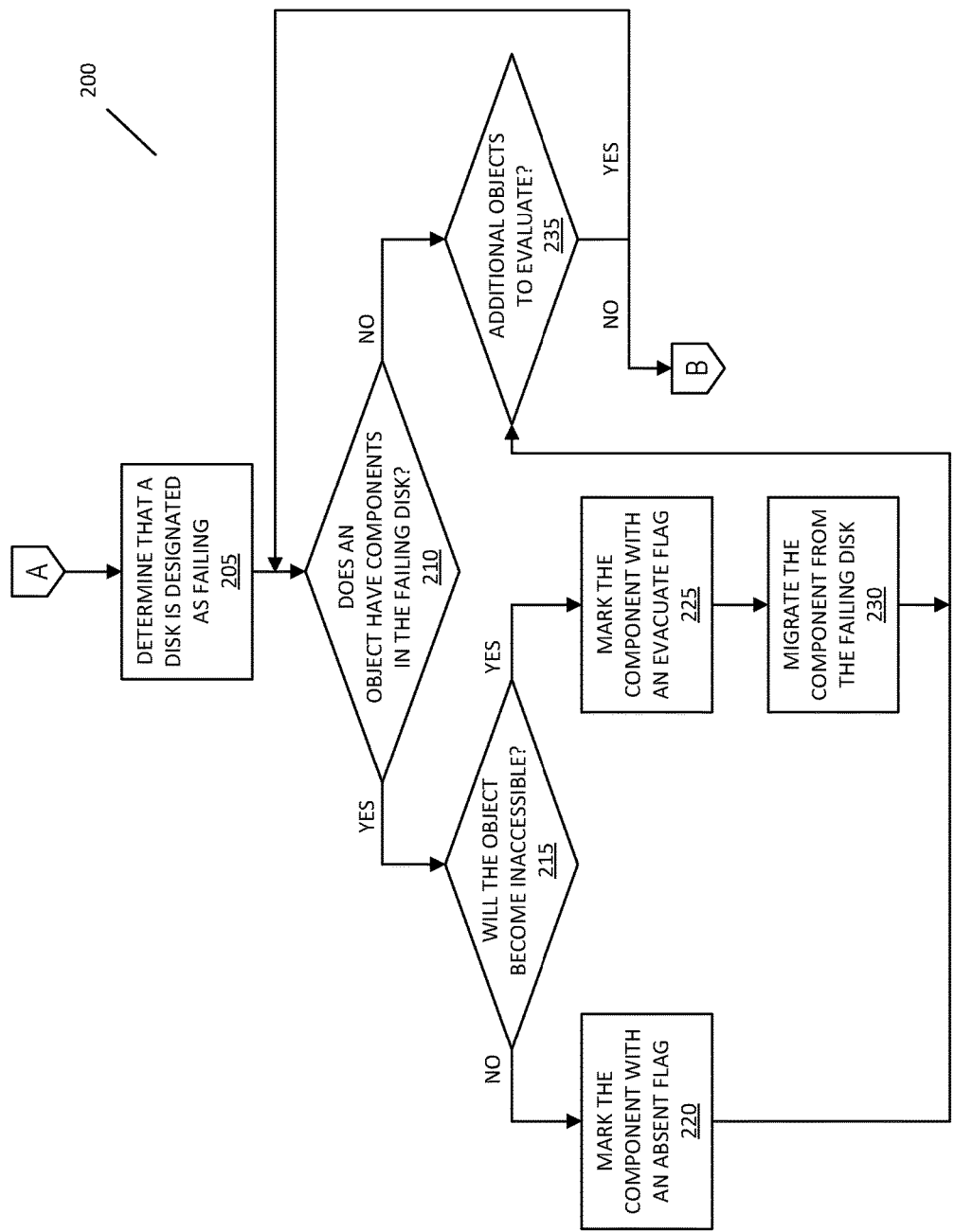
FIG. 2 is a flow chart illustrating an exemplary method of managing object components stored on a failing disk drive within a distributed storage system.

FIG. 2 is a flow chart illustrating an exemplary method 200 of managing object components stored on a failing disk drive within distributed storage system 100.

At block 205, object coordinator 159 determines that a disk drive is designated as a failing disk drive. In some embodiments, object coordinator 159 accesses a directory that includes information regarding disk drives within the distributed storage system that are failing. Identification information for the disk drive may have been placed in the directory upon being determined to be a failing drive via method 300, as described with respect to FIG. 3.

At block 210, object coordinator 159 determines whether an object has an object component stored on the failing disk drive. Each object may be comprised of a plurality of object components that are distributed through distributed storage system 100. There may be multiple copies of a single component stored on one or more disk drives in distributed storage system 100. Each object component for an object may include metadata and an object identifier indicating that the object component is associated with a particular object. The object identifier allows for accessing object components in response to I/O requests made to distributed storage system 100. Using the example objects depicted in FIG. 4, object 401 includes three object components, 401A, 401B, and 401C, distributed throughout disk drives 150A-150D, and object 402 includes two object components, 402A and 402B. Some of the object components depicted in FIG. 4 include multiple copies distributed to multiple disk drives. In an alternative embodiment, each of a plurality of object components of an object has a single instance distributed to one of the multiple disk drives.

Object coordinator 159 may make the determination using a mapping of all object components for the object, the mapping including information indicating which object components are stored on each disk drive in distributed storage system 100.

When object coordinator 159 determines that the object does not have an object component on the failing disk drive, the method proceeds to block 235.

When object coordinator 159 determines that the object has an object component on the failing disk drive, at block 215, object coordinator 159 determines if the object will become inaccessible in the event of the failure or unmounting of the failing disk drive. In some embodiments, object coordinator 159 determines that the object will become inaccessible when the object component is the last copy of the object component in the distributed storage system 100 and the disk drive the object component is stored on is failing. In some embodiments, object coordinator 159 determines that the object will become inaccessible when the loss of the data in the object component will result in no complete replica of the data for the object. In such scenarios, the storage object of which the object component is a part, will not be accessible when the disk drive storing the object component fails or is unmounted.

In some embodiments, inaccessibility of the object is determined when the loss of the failing disk drive results in the loss of quorum. For example, if the loss of the object component, even if not the last copy within the distributed storage system, will result in the loss of quorum for the object, object coordinator 159 determines that the object will become inaccessible upon failure of the disk drive. For example, object coordinator 159 determines if the loss of an object component for an object stored on the failing disk drive will result in a lack of a majority of the object components for the object.

At block 220, when object coordinator 159 determines that the object will not become inaccessible upon failure or unmounting of the failing disk drive, object coordinator 159 marks the object component with an "absent" flag. The "absent" flag provides an indication to evacuating agent 161 that the particular object component does not require evacuation or migration from the failing disk drive, and that I/O requests related to the "absent" object component should be directed to another copy of the object component stored on another disk drive that is not failing. The method proceeds to block 235.

At block 225, when the object coordinator 159 determines that the object will become inaccessible upon failure or unmounting of the failing disk drive, the object coordinator 159 marks the object component with an "evacuate" flag. This indicates that in order for the object component, and the corresponding object, to remain accessible in the distributed storage system 100, the object component on the failing disk drive should be evacuated, or migrated, to one or more other disk drives in the distributed storage system 100.

At block 230, an evacuating agent 161 migrates object components from the failing disk drive(s). The evacuating agent 161 determines the object components stored on the failing disk drive(s) that have been marked with the evacuate flag by the object coordinator 159. The evacuating agent 161 migrates each of the object components with the evacuate flag to one or more other disk drives in the distributed storage system 100.

In some embodiments, when an object component has been successfully migrated from the failing disk drive to another disk drive in the distributed storage system 100, the flag for the object component in the failing disk drive is changed from "evacuate" to "evacuated." In some embodiments, object components marked with any other flags, including "evacuated" or "absent," are ignored by the evacuating agent 161 as either previously evacuated or evacuation is not needed. In other embodiments, the object components marked with the "absent" flag are evacuated after all of the object components marked with the "evacuate" flag have been evacuated.

In some embodiments, a state for the failing disk is designated by the disk status detector 157. The failing disk is designated in one of four states: EVACUATING, STUCK, INACCESSIBLE, and EVACUATED. In other embodiments, there may be additional or fewer states, with different designations. The state of the failing disk indicates a status of the disk to prevent premature unmounting of the failing disk. The state for the failing disk is a single aggregated state determined using the flags marked on the object components stored on the failing disk.

The EVACUATING state indicates that there are object components on the failing disk drive that have been marked with the "evacuate" flag, and that have not yet been migrated or evacuated to another disk drive in the distributed storage system 100. The STUCK (or EVACUATION FAILED) state indicates that there are not enough system resources. For example, the failing disk may be in the STUCK state where there is not suitable space on the other disk drives in the distributed storage system 100 to store the object components that are to be evacuated from the failing disk drive. When the failing disk drive is in the STUCK state, the disk status detector 157 may generate a notification indicating the resource(s) needed to complete the evacuation. The INACCESSIBLE state indicates that the failing disk drive is storing at least one object component marked with the "evacuate" flag that is associated with an object that is not "live." For example, if another object component of the object is not accessible, the disk status detector 157 may generate a notification indicating that the object is not accessible and requesting guidance from a user. For example, the user may be prompted to check for any other failed disk drives containing the inaccessible object component to determine if the inaccessible object component can be restored to availability. The EVACUATED state indicates that all object components that were to be evacuated have been evacuated. For example, where the flags for the all of the object components that were marked "evacuate" have been changed to "evacuated," the failing disk drive may be changed from the EVACUATING state to the EVACUATED state. When the failing disk drive is in the EVACUATED state, the failing disk drive can be unmounted or removed from the distributed storage system 100.

At block 235, object coordinator 159 determines whether there are additional objects to evaluate. When there are additional objects to evaluate, the method proceeds to block 210 to evaluate the additional objects. When there are no additional objects to evaluate, disk status detector 157 continues monitoring the plurality of disk drives in the distributed storage system 100 (e.g., by proceeding with method 300 at block 305 via off-page connector B).

Figure 3:
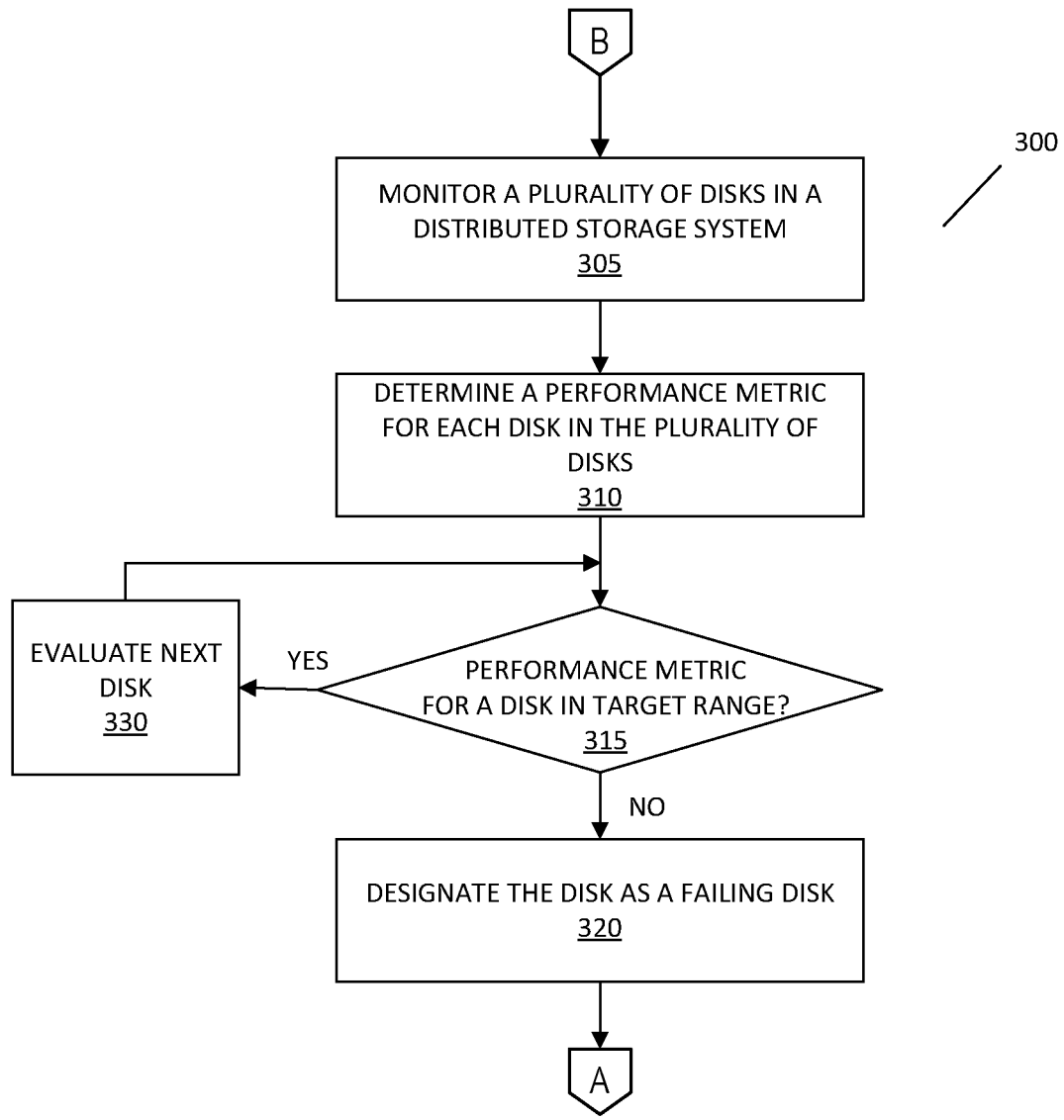
FIG. 3 is a flow chart illustrating an exemplary method of detecting and managing a failing disk drive within a distributed storage system.

FIG. 3 is a flow chart illustrating an exemplary method of detecting and managing a failing disk drive within a distributed storage system. At block 305, disk status detector 157 monitors one or more disk drives in a distributed storage system 100. For example, disk status detector 157 monitors the disk drives in a particular node 105 of the distributed storage system 100.

At block 310, disk status detector 157 determines a performance metric for each disk in the plurality of disks. Disk status detector 157 measures a value for the performance metric. Example performance metrics that may be measured by disk status detector 157 include, but are not limited to, input/output latency, CPU performance, error rate, number of bad sectors, and throughput.

To determine the performance metric for a disk drive, disk status detector 157 evaluates the disk over a predetermined period of time and measures the performance metric for the disk at two or more times in the predetermined period of time. In some embodiments, the two or more times in the predetermined period of time are chosen to be non-continuous intervals within the predetermined period of time having a minimum number of I/O requests. Disk status detector 157 uses the measured performance metrics to determine a rolling average of the measured performance metric. In some embodiments, disk status detector 157 measures the performance metric through continuous intervals comprising the predetermined period of time, and determines the rolling average using a selection of two or more intervals that are non-continuous.

At block 315, disk status detector 157 determines whether the performance metric for a disk is within the target range. Disk status detector 157 compares the measured performance metric with the appropriate target range or threshold value for the performance metric. The target range and/or threshold value may be unique to each disk drive in the distributed storage system 100 or may be uniform across all disk drives in the distributed storage system 100.

In some embodiments, the target range or threshold value is user-defined. In other embodiments, target ranges and thresholds may be modified based on performance of the system. For example, where a particular disk drive is evaluated by the disk status detector 157 and marked as failing, but is healthy, target ranges and thresholds for the particular disk drive, similar disk drives, and/or all disk drives may be modified to refine the determination of health in future disk drive analyses.

At block 320, in response to determining that the performance metric for the disk is not within the target range, disk status detector 157 designates the disk as a failing disk. In some embodiments, disk status detector 157 transmits a notification for publishing to a directory or similar data structure. The directory is accessible by or synchronized between a plurality of object coordinators for a plurality of objects. The method then proceeds to manage the objects stored on the failing disk drive (e.g., by proceeding with method 200 at block 205 via off-page connector A).

In response to determining that the performance metric for the disk is within the target range, disk status detector 157 proceeds to block 330 to recursively evaluate the next disk in the plurality of disks. In some embodiments, disk status detector 157 continuously monitors and evaluates the performance metrics for the plurality of disks in the distributed storage system 100.

In other embodiments, disk status detector 157 transmits the notification directly to one or more object coordinators 159. In some embodiments, in response to determining the disk has been designated as failing, an object coordinator blocks or prevents the storage of new components on the failing disk.

Figure 4:
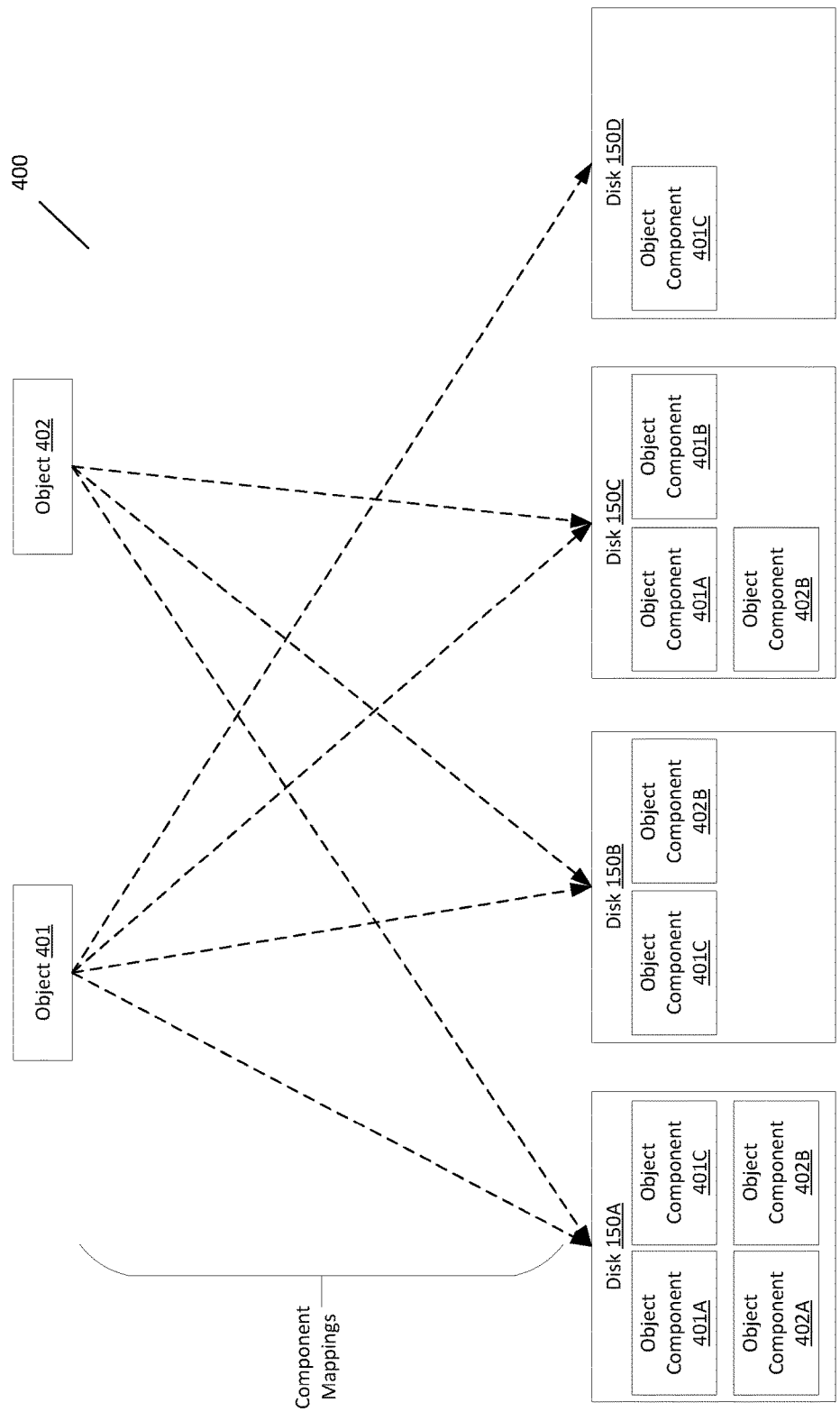
FIG. 4 illustrates an exemplary distribution of object components for objects in a distributed storage system.

FIG. 4 illustrates an exemplary distribution of object components for objects in a distributed storage system.

In FIG. 4, object 401 includes three object components, 401A, 401B, and 401C, distributed throughout disk drives 150A-150D. The mapping between each object and the distributed components of the object, e.g., as maintained by object coordinator(s) 159, is represented by directional broken lines. Object component 401A is stored on disk drive 150A and disk drive 150C, object component 401B is stored on disk drive 150C, and object component 401C is stored on disk drives 150A, 150B, and 150D. Object 402 in FIG. 4 includes two object components, 402A and 402B. Object component 402A is stored on disk drive 150A, and object component 402B is stored on disk drives 150A, 150B, and 150C.

Assuming disk drive 150C has been designated as a failing disk drive by disk status detector 157, an object coordinator for object 401 will determine that object components 401A and 401B are stored on disk drive 150C. The object coordinator for object 401 will determine whether object 401 will become inaccessible upon the failure or unmounting of disk drive 150C. Object coordinator determines whether the failure or unmounting of disk drive 150C will result in no complete replica of the data of object 401 being available or a loss of quorum. As object component 401A has a copy stored on disk drive 150A, object component 401A in disk drive 150C is marked "absent." The object coordinator for object 401 also determines that object component 401B is the only instance of object component 401B in the distributed storage system, and that its loss will result in object 401 being inaccessible upon the failure or unmounting of disk drive 150C and mark object component 401B in disk drive 150C as "evacuate." Similarly, the object coordinator for object 402 will mark object component 402B as "absent," for at least also being stored on disk drives 150A and 150B. Evacuation agent 161 determines that object component 401B is marked "evacuate" and proceed to migrate object component 401B to one or more of disk drives 150A, 150B, and 150D.

Assuming disk drive 150B has been designated as a failing disk drive by disk status detector 157, the object coordinator for object 401 will determine that object component 401C is stored on disk drive 150B, and the object coordinator for object 402 will determine that object component 402B is stored on disk drive 150B. As object 401 will not become inaccessible upon the failure or unmounting of disk drive 150B for at least having object component 401C also being stored on disk drives 150A and 150D. Similarly, the object coordinator for object 402 will mark object component 402B as "absent," for at least also being stored on disk drives 150A and 150C.

In an alternative embodiment, each object component has a single copy stored on one of the disk drives in the distributed storage system. For example, using FIG. 4, object 401 may have object component 401A only stored on disk drive 150A, object component 401B only stored on disk drive 150C, and object component 401C only stored on disk drives 150D. Assuming disk drive 150D has been designated as a failing disk drive by disk status detector 157, an object coordinator for object 401 will determine that object component 401C is stored on disk drive 150D. The object coordinator for object 401 will determine whether object 401 will become inaccessible upon the failure or unmounting of disk drive 150D. If the failure or unmounting of disk drive 150D will result in object 401 being inaccessible, the object coordinator for object 401 will mark object component 401C in disk drive 150D with "evacuate" flag. Evacuation agent 161 determines that object component 401C is marked "evacuate" and proceed to migrate object component 401C to one of disk drives 150A, 150B, and 150C.

Figure 5:
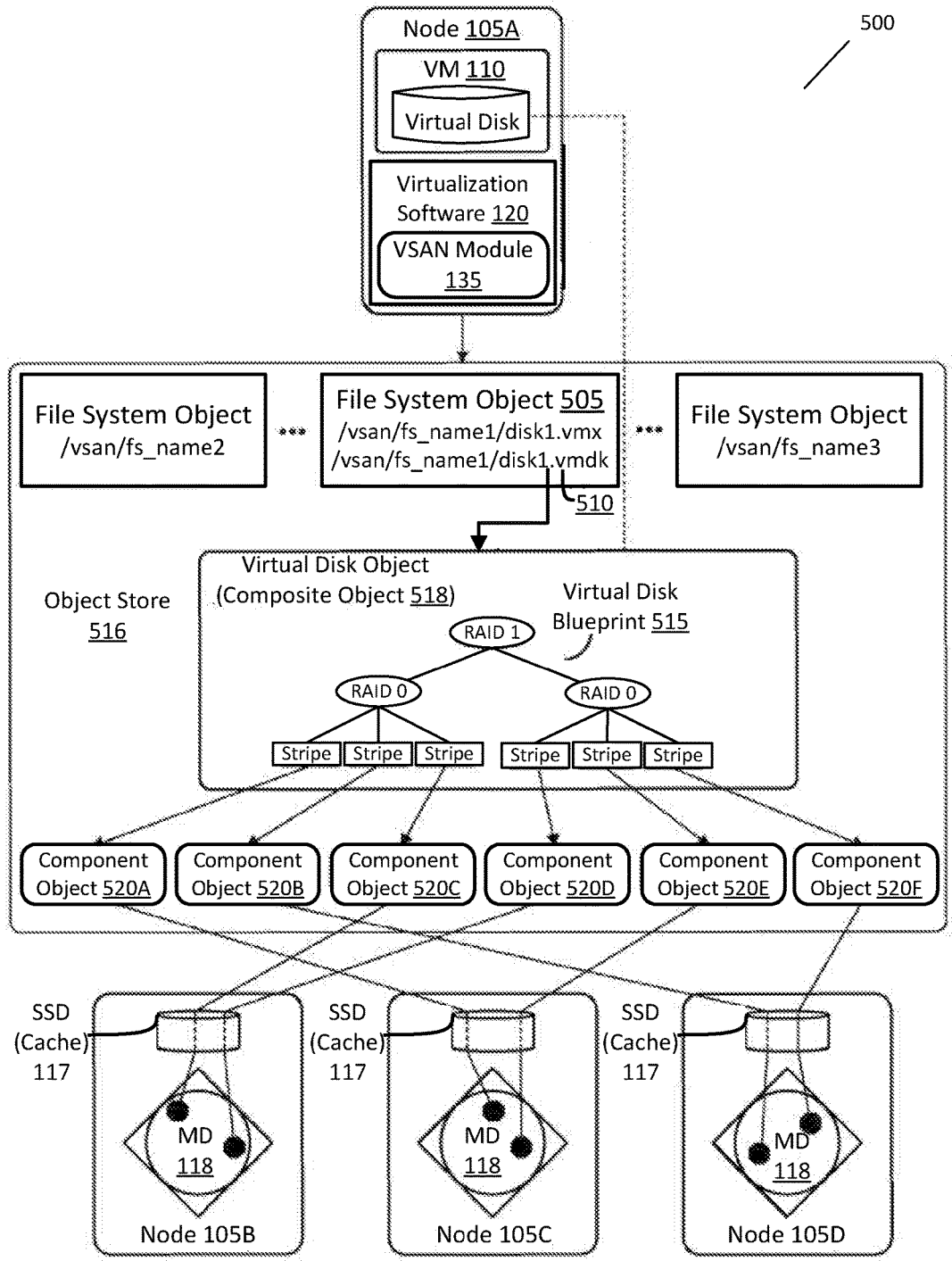
FIG. 5 illustrates an example hierarchical structure of objects organized within an object store that represents a virtual disk, according to one embodiment.

FIG. 5 illustrates an example hierarchical structure of objects organized within object store 516 that represent a virtual disk, according to one embodiment. As previously discussed above, a VM 110 running on one of nodes 105 may perform I/O operations on a virtual disk that is stored as a hierarchical or composite object 518 in object store 516. Virtualization software 120 provides VM 100 access to the virtual disk by interfacing with the VSAN module 135 (e.g., by auto-mounting the top-level file system object corresponding to the virtual disk object, in one embodiment). For example, VSAN module 135, by querying its local copy of the in-memory metadata database, is able to identify a particular file system object 505 (e.g., a VMFS file system object in one embodiment, etc.) that stores a descriptor file 510 for the virtual disk (e.g., a .vmdk file, etc.). It should be recognized that the file system object 505 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 510 includes a reference to composite object 518 that is separately stored in object store 516 and conceptually represents the virtual disk (and thus may also be sometimes referenced herein as a virtual disk object). Composite object 518 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 5, composite object 518 includes a virtual disk blueprint 515 that describes a RAID 1 configuration where two mirrored copies of the virtual disk (e.g., mirrors) are each further striped in a RAID 0 configuration. Composite object 518 may thus contain references to a number of "leaf" or "component" objects 520A-520F corresponding to each stripe (e.g., data partition of the virtual disk) in each of the virtual disk mirrors. The metadata accessible by VSAN module 135 in the in-memory metadata database for each component object 220 (e.g., for each stripe) provides a mapping to or otherwise identifies a particular node 105X in a cluster that houses the physical storage resources (e.g., SSDs 117, magnetic disks 118) that actually store the stripe (as well as the location of the stripe within such physical resource).

It will be apparent from this description that aspects of the inventions may be embodied, at least in part, in software. That is, the computer-implemented methods 200 and 300 may be carried out in a computer system or other data processing system, such as nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   determining that a disk in a distributed storage system has been designated as failing; and in response to determining the disk has been designated as failing,
   determining a first storage object has a first component stored on the failing disk, wherein the first component belongs to a set of one or more components that make up the first storage object,
   determining whether the first storage object will be accessible upon loss of the first component on the failing disk based on whether sufficient copies of the first component are stored on other disks of the distributed storage system to maintain accessibility of the first storage object, and
   in response to determining that the first storage object will no longer be accessible upon loss of the first component on the failing disk, migrating the first component from the failing disk to one or more other disks in the distributed storage system.

2. The computer-implemented method of claim 1, wherein migrating the first component from the failing disk to the one or more other disks in the distributed storage system further comprises:
   determining that the first component has been designated with an evacuate flag; and
   modifying the evacuate flag to an evacuated flag when the first component is successfully migrated to the one or more other disks.

3. The computer-implemented method of claim 1, further comprising:
   determining the first storage object has a second component of the set of components stored on the failing disk;
   determining that the first storage object will be accessible upon loss of the second component on the failing disk; and
   in response to determining that the first storage object will be accessible upon loss of the second component on the failing disk, designating the second component with an absent flag.

4. The computer-implemented method of claim 1, further comprising:
   monitoring a plurality of disks in the distributed storage system;
   determining a performance metric for each disk in the plurality of disks;
   determining that the performance metric for a particular disk in the plurality of disks is outside a target range for the performance metric; and
   in response to determining the performance metric is outside the target range, designating the disk as failing.

5. The computer-implemented method of claim 4, wherein determining the performance metric for the particular disk is outside the target range comprises:
   evaluating the particular disk over a predetermined period of time;
   measuring the performance metric for the particular disk at two or more times in the predetermined period of time, the two or more times being non-continuous intervals within the predetermined period of time having a minimum number of I/O requests;
   calculating the determined performance metric for the particular disk using a rolling average of the measured performance metric; and
   comparing the determined performance metric for the particular disk to the target range.

6. The computer-implemented method of claim 1, further comprising:
   in response to determining the disk has been designated as failing, preventing new components from being stored on the failing disk.

7. The computer-implemented method of claim 1, wherein designating the disk as failing comprises:
   publishing a notification to a data structure associated with the distributed storage system, the data structure accessible by a plurality of object coordinators for a plurality of objects, the plurality of object coordinators running on devices storing objects within the distributed storage system.

8. A non-transitory computer-readable medium storing instructions, which when executed by a processing device, cause the processing device to perform operations comprising:
   determining that a disk in a distributed storage system has been designated as failing; and in response to determining the disk has been designated as failing, determining a first storage object has a first component stored on the failing disk, wherein the first component belongs to a set of one or more components that make up the first storage object, determining whether the first storage object will be accessible upon loss of the first component on the failing disk based on whether sufficient copies of the first component are stored on other disks of the distributed storage system to maintain accessibility of the first storage object, and in response to determining that the first storage object will no longer be accessible upon loss of the first component on the failing disk, migrating the first component from the failing disk to one or more other disks in the distributed storage system.

9. The non-transitory computer-readable medium of claim 8, wherein migrating the first component from the failing disk to the one or more other disks in the distributed storage system further comprises:

determining that the first component has been designated with an evacuate flag; and modifying the evacuate flag to an evacuated flag when the first component is successfully migrated to the one or more other disks.

10. The non-transitory computer-readable medium of claim 8, further comprising instructions that when executed by the processing device cause the processing device to perform operations comprising:

determining the first storage object has a second component of the set of components stored on the failing disk;

determining that the first storage object will be accessible upon loss of the second component on the failing disk; and in response to determining that the first storage object will be accessible upon loss of the second component on the failing disk, designating the second component with an absent flag.

11. The non-transitory computer-readable medium of claim 8, further comprising instructions that when executed by the processing device cause the processing device to perform operations comprising:

monitoring a plurality of disks in the distributed storage system;

determining a performance metric for each disk in the plurality of disks;

determining that the performance metric for a particular disk in the plurality of disks is outside a target range for the performance metric; and in response to determining the performance metric is outside the target range, designating the disk as failing.

12. The non-transitory computer-readable medium of claim 11, wherein determining the performance metric for the particular disk is outside the target range comprises:

evaluating the particular disk over a predetermined period of time;

measuring the performance metric for the particular disk at two or more times in the predetermined period of time, the two or more times being non-continuous intervals within the predetermined period of time having a minimum number of I/O requests;

calculating the determined performance metric for the particular disk using a rolling average of the measured performance metric; and comparing the determined performance metric for the particular disk to the target range.

13. The non-transitory computer-readable medium of claim 8, further comprising instructions that when executed by the processing device cause the processing device to perform operations comprising:

in response to determining the disk has been designated as failing, preventing new components from being stored on the failing disk.

14. The non-transitory computer-readable medium of claim 8, wherein designating the disk as failing comprises:

publishing a notification to a data structure associated with the distributed storage system, the data structure accessible by a plurality of object coordinators for a plurality of objects, the plurality of object coordinators running on devices storing objects within the distributed storage system.

15. An apparatus comprising:

a processing device; and a memory coupled to the processing device, the memory storing instructions which, when executed by the processing device, cause the apparatus to:

determine that a disk in a distributed storage system has been designated as failing; and in response to determining the disk has been designated as failing, determine a first storage object has a first component stored on the failing disk, wherein the first component belongs to a set of one or more components that make up the first storage object, determining whether the first storage object will be accessible upon loss of the first component on the failing disk based on whether sufficient copies of the first component are stored on other disks of the distributed storage system to maintain accessibility of the first storage object, and in response to determining that the first storage object will no longer be accessible upon loss of the first component on the failing disk, migrating the first component from the failing disk to one or more other disks in the distributed storage system.

16. The apparatus of claim 15, wherein migrating the first component from the failing disk to the one or more other disks in the distributed storage system further comprises:

determining that the first component has been designated with an evacuate flag; and modifying the evacuate flag to an evacuated flag when the first component is successfully migrated to the one or more other disks.

17. The apparatus of claim 15, wherein the instructions further cause the apparatus to:

determine the first storage object has a second component of the set of components stored on the failing disk;

determine that the first storage object will be accessible upon loss of the second component on the failing disk; and in response to determining that the first storage object will be accessible upon loss of the second component on the failing disk, designating the second component with an absent flag.

18. The apparatus of claim 15, wherein the instructions further cause the apparatus to:

monitor a plurality of disks in the distributed storage system;

determine a performance metric for each disk in the plurality of disks;

determine that the performance metric for a particular disk in the plurality of disks is outside a target range for the performance metric; and in response to determining the performance metric is outside the target range, designate the disk as failing.

19. The apparatus of claim 18, wherein determining the performance metric for the particular disk is outside the target range comprises:
- evaluating the particular disk over a predetermined period of time;
- measuring the performance metric for the particular disk at two or more times in the predetermined period of time, the two or more times being non-continuous intervals within the predetermined period of time having a minimum number of I/O requests;
- calculating the determined performance metric for the particular disk using a rolling average of the measured performance metric; and
- comparing the determined performance metric for the particular disk to the target range.

20. The apparatus of claim 15, wherein the instructions further cause the apparatus to:
- in response to determining the disk has been designated as failing, prevent new components from being stored on the failing disk.

* * * * *